(12) United States Patent
Gwon et al.

(10) Patent No.: US 8,886,443 B2
(45) Date of Patent: Nov. 11, 2014

(54) ISG CONTROL METHOD FOR VEHICLE IN CONGESTED AREA

(75) Inventors: Chongah Gwon, Hwaseong-si (KR); Sejun Kim, Seoul (KR); Jiyong Yu, Pocheon-si (KR); Junghwan Bang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 331 days.

(21) Appl. No.: 13/306,567

(22) Filed: Nov. 29, 2011

(65) Prior Publication Data

US 2012/0143469 A1 Jun. 7, 2012

(30) Foreign Application Priority Data

Dec. 1, 2010 (KR) ........................ 10-2010-0121679

(51) Int. Cl.
*G06F 19/00* (2011.01)
*G06G 7/70* (2006.01)
*F02N 11/08* (2006.01)

(52) U.S. Cl.
CPC ..... *F02N 11/0837* (2013.01); *F02N 2200/0801* (2013.01); *Y02T 10/48* (2013.01); *F02N 2200/102* (2013.01); *F02N 2200/0802* (2013.01)
USPC ........................................ 701/112; 123/179.4

(58) Field of Classification Search
USPC ......... 123/179.1, 179.3, 179.4; 701/102, 112, 701/113; 340/455
See application file for complete search history.

(56) References Cited

U.S. PATENT DOCUMENTS

| 3,859,627 | A | 1/1975 | Quantz |
| 4,312,310 | A | 1/1982 | Chivilo' et al. |
| 6,445,982 | B1 | 9/2002 | Swales et al. |
| 7,082,914 | B2 | 8/2006 | You |
| 7,083,020 | B2 * | 8/2006 | Morimoto et al. ......... 180/65.26 |
| 7,149,621 | B2 | 12/2006 | Kishibata et al. |
| 7,882,420 | B2 | 2/2011 | Moore et al. |
| 8,370,051 | B2 | 2/2013 | Pursifull et al. |
| 8,527,145 | B2 | 9/2013 | Yu et al. |
| 8,676,479 | B2 | 3/2014 | Pursifull et al. |

(Continued)

FOREIGN PATENT DOCUMENTS

| DE | 10211463 B3 | 1/2004 |
| EP | 1612408 A1 | 1/2006 |

(Continued)

*Primary Examiner* — Thomas Moulis
*Assistant Examiner* — Joseph Dallo
(74) *Attorney, Agent, or Firm* — Morgan, Lewis & Bockius LLP

(57) ABSTRACT

An ISG control method for a vehicle in a congested area, may include an N-stage stop determining step that determines whether a shift lever has moved from a D-stage to an N-stage and a brake has been operated, discriminating from when the shift lever is at the D-stage; an N-stage vehicle speed determining step that determines whether a vehicle speed is equal to or less than a predetermined N-stage stop vehicle speed after the N-stage stop determining step; and a remaining condition determining step for entering an idle-stop state, when the vehicle speed is equal to or less than the N-stage stop vehicle speed, as a result of performing the N-stage vehicle speed determining step, and when idle-stop entering conditions other than a position of the shift lever, the vehicle speed, and the history of a maximum traveling vehicle speed are satisfied.

5 Claims, 2 Drawing Sheets

(56) References Cited

U.S. PATENT DOCUMENTS

| | | |
|---|---|---|
| 2001/0013701 A1 | 8/2001 | Onoyama et al. |
| 2002/0138182 A1 | 9/2002 | Swales et al. |
| 2003/0135321 A1 | 7/2003 | Kumazaki et al. |
| 2003/0197991 A1 | 10/2003 | Kahlon et al. |
| 2005/0055152 A1 | 3/2005 | Wakashiro et al. |
| 2005/0139182 A1 | 6/2005 | You |
| 2006/0011163 A1 | 1/2006 | Watanabe et al. |
| 2006/0137651 A1 | 6/2006 | Kishibata et al. |
| 2006/0145536 A1 | 7/2006 | Hackl et al. |
| 2006/0224279 A1 | 10/2006 | Mori |
| 2006/0231074 A1 | 10/2006 | Ueno et al. |
| 2007/0199533 A1 | 8/2007 | Takahashi |
| 2007/0267238 A1 | 11/2007 | Guy et al. |
| 2009/0271095 A1* | 10/2009 | Kojima ................ 701/113 |
| 2009/0292455 A1 | 11/2009 | Abendroth et al. |
| 2009/0312940 A1 | 12/2009 | Poudrier et al. |
| 2010/0000487 A1 | 1/2010 | Hoshino et al. |
| 2010/0174477 A1 | 7/2010 | Ozaki et al. |
| 2010/0185390 A1 | 7/2010 | Monde et al. |
| 2010/0282200 A1* | 11/2010 | Notani et al. ............. 123/179.3 |
| 2010/0286887 A1 | 11/2010 | Maruyama |
| 2010/0312426 A1 | 12/2010 | Philipp et al. |
| 2010/0332064 A1 | 12/2010 | Rieling et al. |
| 2011/0160964 A1 | 6/2011 | Obradovich |
| 2011/0160985 A1 | 6/2011 | Yamaguchi |
| 2012/0143481 A1* | 6/2012 | Yu et al. .................... 701/113 |

FOREIGN PATENT DOCUMENTS

| | | |
|---|---|---|
| EP | 2199595 A1 | 6/2010 |
| GB | 2451171 B | 9/2012 |
| JP | 2001-97071 A | 4/2001 |
| JP | 2002-257220 A | 9/2002 |
| JP | 2004-116389 A | 4/2004 |
| JP | 2004-143934 A | 5/2004 |
| JP | 2005-23837 A | 1/2005 |
| JP | 2007-146727 A | 6/2007 |
| JP | 2009-2236 A | 1/2009 |
| JP | 4530060 B2 | 6/2010 |

* cited by examiner

ISG CONTROL METHOD FOR VEHICLE IN CONGESTED AREA

CROSS-REFERENCE TO RELATED APPLICATIONS

The present application claims priority to Korean Patent Application Number 10-2010-0121679 filed Dec. 1, 2010, the entire contents of which application is incorporated herein for all purposes by this reference.

BACKGROUND OF THE INVENTION

1. Field of the Invention

The present invention relates to an ISG control method for a vehicle, and particularly, to an ISG control method under a situation that a vehicle repeatedly stops in a congested area, when an ISG function is implemented in a vehicle with an automatic transmission.

2. Description of Related Art

ISG (Idle Stop & Go) systems improve fuel efficiency of vehicles by stopping the engine in idling, on the basis of information, such as the speed, the rotational speed of the engine, and the temperature of the cooling water when a vehicle stops.

It is also possible to improve fuel efficiency, as described above, by implementing the ISG function in a vehicle with an automatic transmission.

However, a specific control method for a vehicle traveling in a congested area is not provided when implementing the ISG function in the vehicle, which is equipped with an automatic transmission.

That is, as shown in FIG. 1, when the shift lever is at the D-stage or N-stage, the brake is operated (S500), and the maximum traveling speed is at a predetermined level or more, it is determined that the vehicle has traveled after the previous idle-stop (S501), and when the present vehicle speed is at a level where it can be recognized that the vehicle is almost stopped (S502) and other ISG enter conditions are satisfied (S503), the engine is stopped and an idle-stop state is implemented (S504) on the basis of those facts.

Further, when it is requested to restart the engine after the idle-stop state is implemented (S505), the idle-stop state is removed by restarting the engine (S506).

The ISG function is controlled while making a loop entering the idle-stop state and coming out from the idle-stop.

In general, when the control is performed in a congested area, creep traveling for adjusting the inter-vehicle distance right after the engine is stopped is frequently performed, such that the conditions for the history of the maximum traveling speed cannot be satisfied.

Therefore, it is difficult to enter the idle-stop state even if it is required to enter the idle-stop state.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an ISG control method in a congested area which can improve fuel efficiency of a vehicle by making it possible to repeatedly and appropriately enter an idle-stop state even if conditions for the history of the maximum traveling speed are difficult to be satisfied due to repetition of creep traveling for adjusting the inter-vehicle distance when an ISG function is implemented in a vehicle with an automatic transmission in a congested area.

In an aspect of the present invention, an ISG control method for a vehicle in a congested area, may include an N-stage stop determining step that determines whether a shift lever may have moved from a D-stage to an N-stage and a brake may have been operated, discriminating from when the shift lever is at the D-stage, an N-stage vehicle speed determining step that determines whether a vehicle speed is equal to or less than a predetermined N-stage stop vehicle speed after the N-stage stop determining step, and a remaining condition determining step for entering an idle-stop state, when the vehicle speed is equal to or less than the N-stage stop vehicle speed, as a result of performing the N-stage vehicle speed determining step, and when idle-stop entering conditions other than a position of the shift lever, the vehicle speed, and the history of a maximum traveling vehicle speed are satisfied.

The predetermined N-stage stop vehicle speed in the N-stage vehicle speed determining step is set different from a D-stage stop vehicle speed that is a reference for determining whether it may have been possible to enter the idle-stop state at the vehicle speed with the shift lever at the D-stage.

The ISG control method may further include an accumulated number of time determining step for entering the remaining condition determining step only for an accumulated number of time of idle-stop less than a predetermined reference number of time by determining whether the accumulated number of time of idle-stop is less than the predetermined number of time between the N-stage stop determining step and the remaining condition determining step.

The accumulated number of time of idle-stop in the accumulated number of time determining step is initialized when the shift lever is moved to select an R-stage or a P-stage.

The ISG control method may further include a time-passing determining step for entering the remaining condition determining step only when a present time exceeds a reference time, by determining whether the present time may have passed the predetermined reference time after restarting an engine between the N-stage stop determining step and the remaining condition determining step.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
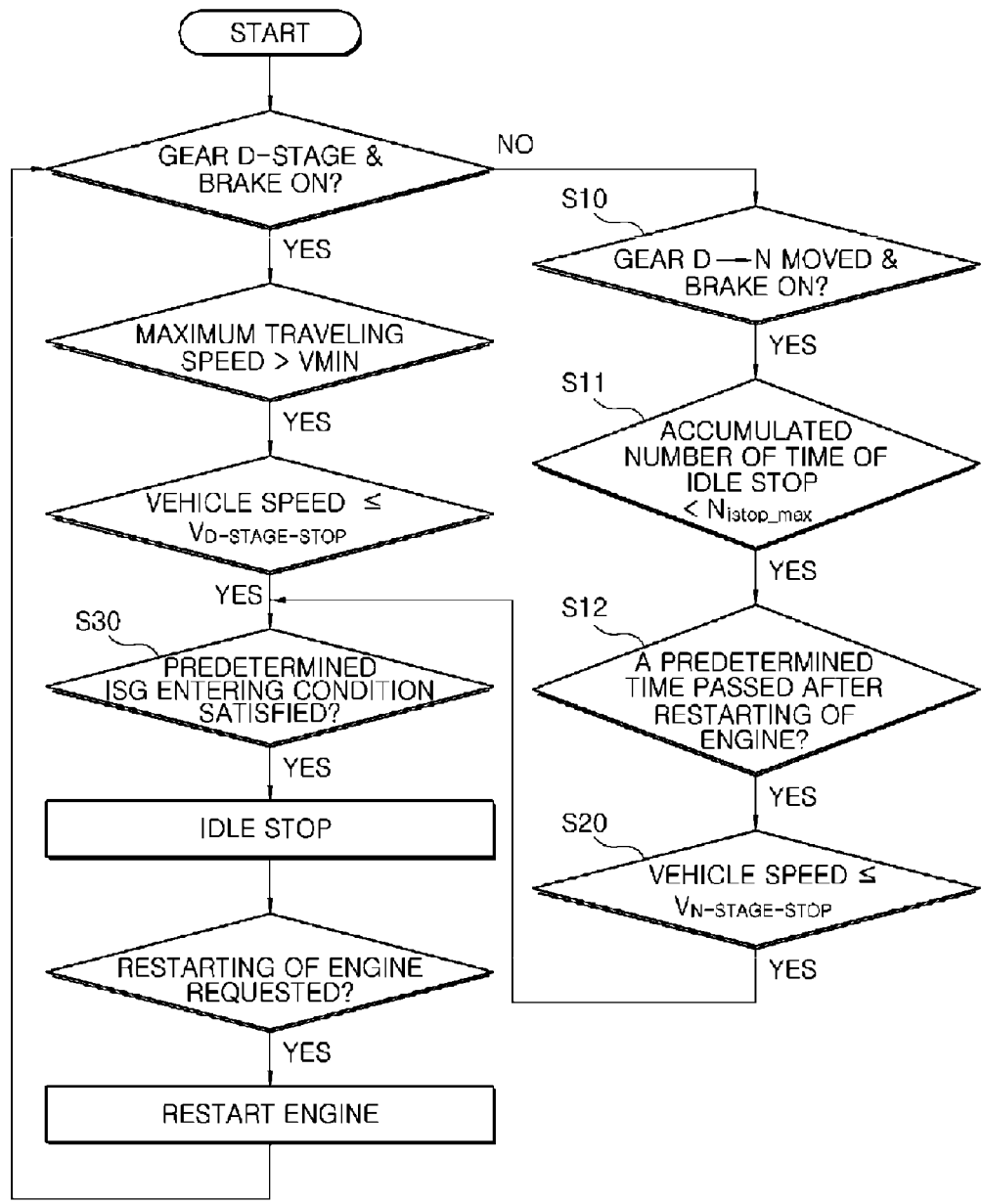
FIG. 2 is a flowchart illustrating an ISG control method of a vehicle in a congested area according to an exemplary embodiment of the present invention.

Referring to FIG. 2, an ISG control method according to an exemplary embodiment of the present invention includes, in addition to control methods of the related art, an N-stage stop determining step (S10) that determines whether a shift lever has moved from a D-stage to an N-stage and a brake has been operated, discriminating from when the shift lever is at the D-stage, and an N-stage vehicle speed determining step (S20) that determines whether the vehicle speed is a predetermined N-stage stop vehicle speed after N-stage stop determining step (S10).

When the vehicle speed is the N-stage stop vehicle speed or less, as a result of performing N-stage vehicle speed determining step (S20) after performing N-stage vehicle speed determining step (S20), and when the idle-stop entering conditions other than the position of the shift lever, the vehicle speed, and the history of the maximum traveling vehicle speed are satisfied, a remaining condition determining step (S30) for entering an idle-stop state is performed.

Figure 1:
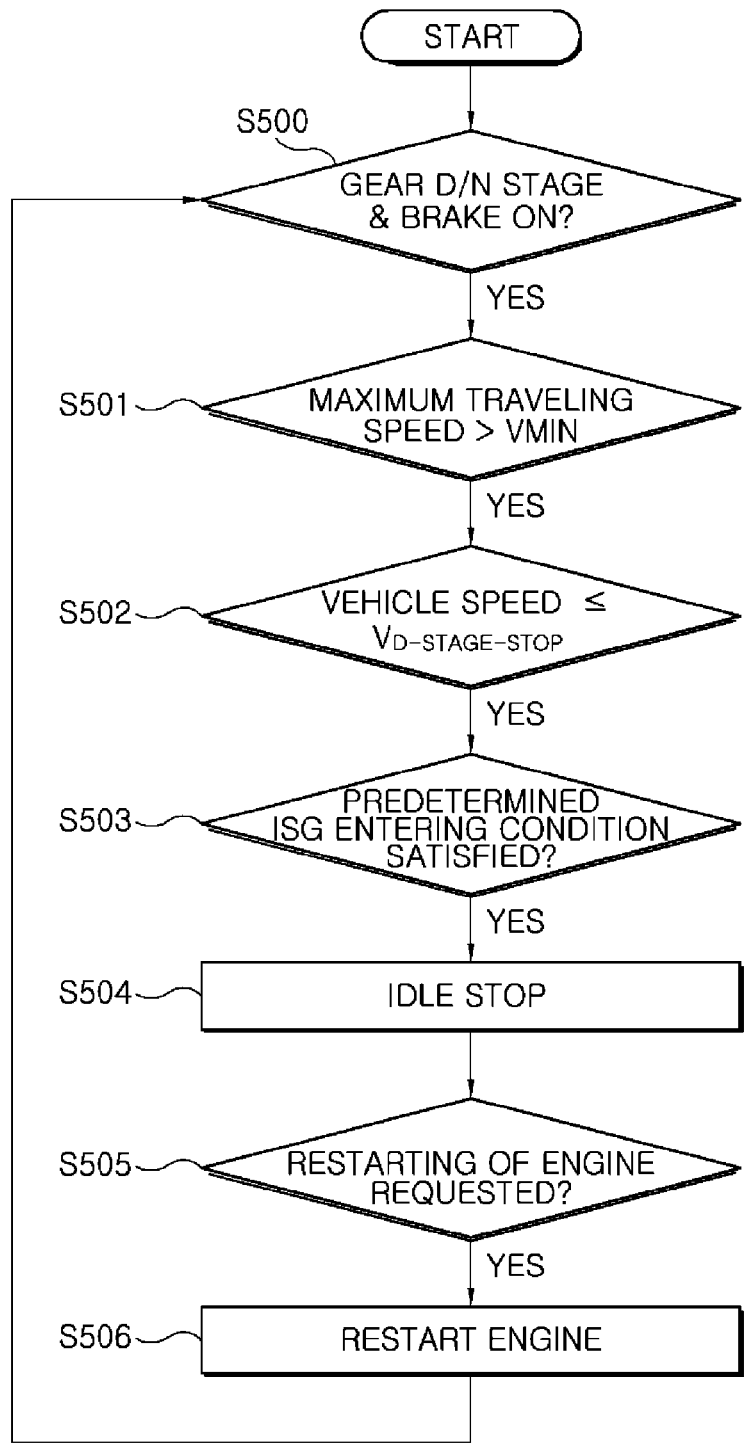
FIG. 1 is a flowchart illustrating an ISG control method of a vehicle in the related art.

However, the processes after remaining condition determining step (S30) are substantially the same, as can be seen by comparing FIGS. 1 and 2.

That is, the exemplary embodiment of the present invention discriminates when N-stage idle-stop is performed by the driver intentionally operating the shift lever to the N-stage from when the idle-stop is performed at the D-stage in an idle-stop control method of the related art.

When N-stage idle-stop is performed in this discriminated state, control of an idle-stop function that can be appropriately applied to a congested area can be performed by making the condition for the vehicle speed different from when the idle-stop is performed at the D-stage, without determining the condition for the history of the maximum traveling vehicle speed.

In other words, when the condition for N-stage stop determining step (S10) is satisfied by moving the shift lever from the D-stage to the N-stage and operating the brake is operated by the driver in a congested area, it is possible to enter the idle-stop state without determining the history about whether the maximum traveling speed of the vehicle has been a reference history vehicle speed Vmin, for example, 10 km/h or more.

Therefore, it is possible to implement an appropriate idle-stop function even after repetitive creep traveling in a congested area.

The N-stage stop vehicle speed $V_{N\text{-}STAGE\text{-}STOP}$ of N-stage vehicle speed determining step (S20) may be set different from the D-stage stop vehicle speed $V_{D\text{-}STAGE\text{-}STOP}$ that is a reference for determining whether it has been possible to enter the idle-stop state at the vehicle speed with the shift lever at the D-stage.

For example, when the D-stage stop vehicle speed is 0 km/h, the N-stage stop vehicle speed is set to 5 km/h. This is because it is possible to consider that entering of the idle-stop was intended, when the driver actively moves the shift lever from the D-stage to the N-stage while stopping the vehicle.

Therefore, it is possible to improve fuel efficiency by making it possible to enter the idle-stop stage early with the vehicle moving at a speed above 0, different from entering of the idle-stop at the D-stage.

The exemplary embodiment further includes an accumulated number of time determining step (S11) for entering remaining condition determining step (S30) only for the accumulated number of time of idle-stop less than a predetermined reference number of time $N_{ISTOP\_MAX}$ by determining that the accumulated number of time of idle-stop is less than the predetermined number of time between N-stage stop determining step (S10) and remaining condition determining step (S30).

Accumulated number of time determining step (S11) is for ensuring durability of a starter motor by limiting excessive idle-stop, in consideration of the durability of the starter motor.

The accumulated number of time of idle-stop in accumulated number of time determining step (S11) may be initialized when the shift lever is moved to select the R-stage or the P-stage and the reference number of time $N_{ISTOP\_MAX}$ is appropriately determined in consideration of the durability of the starter motor.

The exemplary embodiment further includes a time-passing determining step (S12) for entering remaining condition determining step (S30) only when the present time exceeds a reference time, by determining whether the present time has passed the predetermined reference time after restarting the engine, between N-stage stop determining step (S10) and remaining condition determining step (S30).

Time-passing determining step (S12) is to prevent damage to the vehicle due to idle-stop and starting which may be maliciously repeated and the reference time may be appropriately selected for this point.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ISG control method for a vehicle in a congested area, comprising:
    an N-stage stop determining step that determines whether a shift lever is being shifted from a D-stage to an N-stage and then if a brake has been operated, discriminating from when the shift lever is at the D-stage;
    an N-stage vehicle speed determining step that determines whether a vehicle speed is equal to or less than a predetermined N-stage stop vehicle speed after the N-stage stop determining step; and a remaining condition determining step for entering an idle-stop state, when the vehicle speed is equal to or less than the N-stage stop vehicle speed, as a result of performing the N-stage vehicle speed determining step, and when idle-stop entering conditions other than a position of the shift lever, the vehicle speed, and the history of a maximum traveling vehicle speed are satisfied.

2. The ISG control method as defined in claim 1, wherein the predetermined N-stage stop vehicle speed in the N-stage vehicle speed determining step is set different from a D-stage stop vehicle speed that is a reference for determining whether it has been possible to enter the idle-stop state at the vehicle speed with the shift lever at the D-stage.

3. The ISG control method as defined in claim 2, further including: an accumulated number of time determining step for entering the remaining condition determining step only for an accumulated number of time of idle-stop less than a predetermined reference number of time by determining whether the accumulated number of time of idle-stop is less than the predetermined number of time between the N-stage stop determining step and the remaining condition determining step.

4. The ISG control method as defined in claim 3, wherein the accumulated number of time of idle-stop in the accumulated number of time determining step is initialized when the shift lever is moved to select an R-stage or a P-stage.

5. The ISG control method as defined in claim 2, further including: a time-passing determining step for entering the remaining condition determining step only when a present time exceeds a reference time, by determining whether the present time has passed the predetermined reference time after restarting an engine between the N-stage stop determining step and the remaining condition determining step.

* * * * *